J. H. WILSON.
WALL DISTRIBUTING RING FOR TELEPHONE CONSTRUCTIONS.
APPLICATION FILED DEC. 2, 1908.
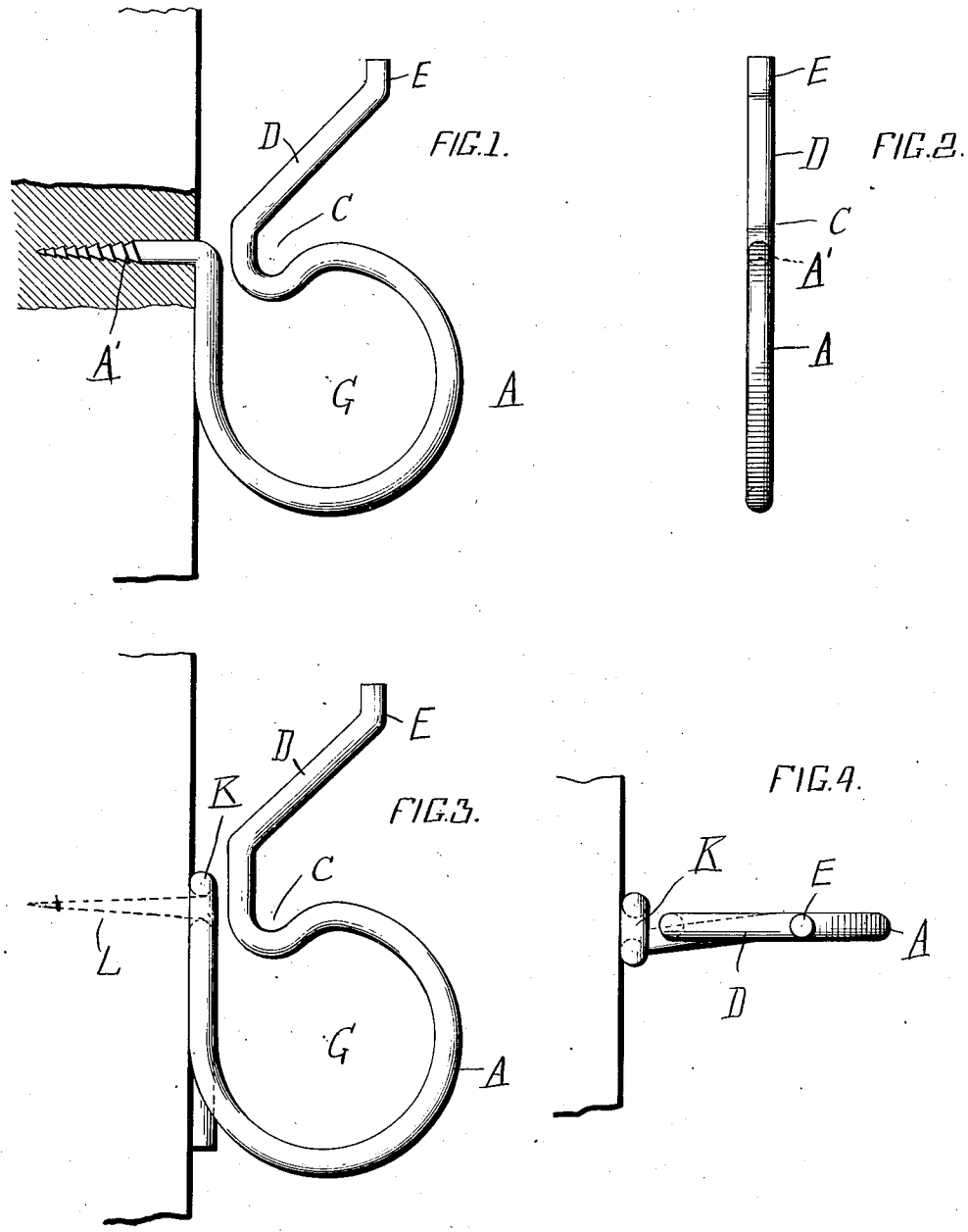

UNITED STATES PATENT OFFICE.

JOHN H. WILSON, OF ROME, GEORGIA.

WALL DISTRIBUTING-RING FOR TELEPHONE CONSTRUCTIONS.

934,255.

Specification of Letters Patent. Patented Sept. 14, 1909.

Application filed December 2, 1908. Serial No. 465,603.

*To all whom it may concern:*

Be it known that I, JOHN H. WILSON, a citizen of the United States, residing at Rome, in the county of Floyd and State of Georgia, have invented certain new and useful Improvements in Wall Distributing-Rings for Telephone Constructions; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in wall distributing rings used in telephone construction and adapted to carry wires from cable terminals to walls of buildings to subscribers' stations and also upon cable poles for running bridle wires from cable boxes to cross arms, etc.

The invention comprises various details of construction, combinations and arrangements of parts which will be hereinafter fully described and then specifically defined in the appended claim.

I illustrate my invention in the accompanying drawings, in which:—

Figure 1 is a side elevation showing a ring embodying the features of my invention as applied to a wall. Fig. 2 is a front view. Fig. 3 is a detail view in side elevation of a slight modification, and Fig. 4 is a top plan view of the form shown in Fig. 3.

Reference now being had to the details of the drawings by letter, A designates a ring bent substantially circular in form and having a threaded end A' adapted to screw into a wall or other object. A portion of the rod or wire out of which the ring is made is upwardly bent at C and thence has an outwardly inclined portion D, while the extreme upper end of the wire is vertically disposed as at E. It will be noted that intermediate the portion of the screw which fastens into the wall or other object and part which is upturned is a space G through which the wires or cables may be inserted into the circular outlined portion of the ring. The metal of which the ring is made being resilient will allow the cable or other wire to be supported to be readily inserted within the ring, after which the ring is sprung back to its normal position.

In Fig. 3 of the drawings, I have shown a slight modification of the invention in which an eye K is formed in one end of the shank portion of the ring and through which a screw L or other fastening device is inserted and driven into the wall.

By the provision of a ring made in accordance with my invention, the circular outlined portion thereof will serve as a means for holding a plurality of cables or other wall wires while the inclined part of the rod or wire out of which the ring is composed and which is disposed at an inclination, as shown, serves as an auxiliary means for holding wires or cables, thus materially increasing the capacity of the ring.

What I claim to be new is:—

A wall distributing ring for holding cables, comprising a wire having an angled end which is threaded and adapted to engage a supporting object, said wire being bent to form a substantially circular outlined ring terminating in an upright shank portion at right angles to and opposite the threaded end of the wire, said upright portion and the shank of the wire at its angled part forming a throat, the upper free end of the wire being bent at an angle above the threaded end and inclined at an angle, as shown and described.

In testimony whereof I hereunto affix my signature in the presence of two witnesses.

JOHN H. WILSON.

Witnesses:
F. L. DARST,
B. F. CLARK.